United States Patent
Lin

(10) Patent No.: US 9,994,364 B1
(45) Date of Patent: *Jun. 12, 2018

(54) REUSABLE SEALING DEVICE FOR PLASTIC COURIER BAG

(71) Applicant: Shih-Fong Lin, New Taipei (TW)

(72) Inventor: Shih-Fong Lin, New Taipei (TW)

(*) Notice: Subject to any disclaimer, the term of this patent is extended or adjusted under 35 U.S.C. 154(b) by 0 days. days.

This patent is subject to a terminal disclaimer.

(21) Appl. No.: 15/373,473

(22) Filed: Dec. 9, 2016

(51) Int. Cl.
*B65D 33/00* (2006.01)
*B65D 33/16* (2006.01)

(52) U.S. Cl.
CPC ................. *B65D 33/1691* (2013.01)

(58) Field of Classification Search
CPC .................................................. B65D 33/1691
USPC .............. 383/203–205, 84, 86; 229/80, 309; 428/40.1, 42.2
See application file for complete search history.

(56) References Cited

U.S. PATENT DOCUMENTS

| | | | | |
|---|---|---|---|---|
| 4,580,683 A * | 4/1986 | Gochenour | ............ | B65D 27/38 206/521 |
| 4,781,296 A * | 11/1988 | Morris | ............ | B26D 3/085 229/309 |
| 4,902,142 A * | 2/1990 | Lammert | ............ | B65D 33/20 383/205 |
| 5,213,258 A * | 5/1993 | Kim | ............ | B65D 75/66 229/301 |
| 6,354,739 B1 * | 3/2002 | Sheehan, Jr. | ............ | B65D 33/24 229/123.2 |
| 6,689,244 B2 * | 2/2004 | Schwertfeger | ............ | B65D 5/0236 156/247 |
| 6,692,149 B2 * | 2/2004 | Baker | ............ | B65D 33/1691 383/203 |
| 6,951,301 B2 * | 10/2005 | Miaskiewicz, Jr. | ............ | B65D 5/0236 229/125.37 |
| 6,955,466 B1 * | 10/2005 | Soderholm | ............ | B65D 27/08 229/309 |
| 6,991,838 B2 * | 1/2006 | Schwertfeger | ............ | B65D 5/0236 156/247 |
| 8,562,216 B2 * | 10/2013 | Kendall | ............ | B65D 27/14 229/313 |
| 9,714,112 B1 * | 7/2017 | Lin | ............ | B65D 5/541 |

* cited by examiner

Primary Examiner — Jes F Pascua
(74) Attorney, Agent, or Firm — Leong C. Lei

(57) ABSTRACT

The sealing device involves an elongated release base member having a separation line along the release base member's length. A double-sided adhesive layer is attached to a side of the release base member so that the release base member may adhere to an inner side of a plastic courier bag's sealing flap and seal the plastic courier bag. A reinforcing tape may be further applied to an outer side of the plastic courier bag's sealing flap. The plastic courier bag may be quickly and conveniently opened by tearing down a pull strip of the sealing device. The plastic courier bag may be reused multiple times by applying new, unused sealing devices.

4 Claims, 15 Drawing Sheets

REUSABLE SEALING DEVICE FOR PLASTIC COURIER BAG

BACKGROUND OF THE INVENTION

(a) Technical Field of the Invention

The present invention is generally related to the sealing of envelope or bag, and more particular to a reusable and convenient sealing device for a plastic courier bag.

(b) Description of the Prior Art

For on-line store owners and electronic commerce operators, they usually package magazines, books, and similar paper products in a plastic courier bag before handing them to the couriers. The plastic courier bag has a bag member with an opening along a side and a sealing flap extended from the opening. An inner side of the sealing flap facing the opening is coated with adhesive. The to-be-delivered product is placed in the bag member, the sealing flat is flipped to cover the opening and adhered to the bag member. Postal and express delivery operators also follow similar practices.

When a customer receives such a bag, he/she usually has to cut or tear open the bag member along the sealing flap. Either way, the bag member is damaged, cannot be reused, and therefore has to be trashed. This is not only wasteful but also not environmentally friendly as the plastic bag is not self-decomposable.

SUMMARY OF THE INVENTION

The objective of the present invention is to provide a sealing device for plastic courier bags so that the bags may be conveniently sealed, opened, and, most importantly, the bags may be reused multiple times.

The characteristic of the present invention involves an elongated release base member having a separation line along the release base member's length. A double-sided adhesive layer is attached to a side of the release base member so that the release base member may adhere to an inner side of the plastic courier bag's sealing flap and seal the plastic courier bag. Multiple sealing devices of the present invention may be applied to the inner side of a plastic courier bag and multiple reinforcing tapes may be applied to the outer side. In this way, the plastic courier bag may be reused many times.

The sealing device includes a release base member of an elongate shape having a separation line along a length of the release base member separating the release base member into a base piece and a pull strip, a double-sided adhesive layer having a first adhesive piece and a second adhesive piece on two major sides of the double-sided adhesive layer, respectively, where the first adhesive piece is for adhering to a major side of the release base member, the second adhesive piece is for adhering to an inner side of a sealing flap of the plastic courier bag, and, to seal the plastic courier bag, the base piece is removed from the release base member, and a reinforcing tape for adhering to an outer side of the sealing flap corresponding to the pull strip.

Preferably, the base piece has a series of protrusions disposed along a main edge of the base piece, protruding along a direction of the base piece's width. The protrusions jointly form various shapes so as to facilitate the removal of the base piece.

Preferably, the reinforcing tape has a greater width than that of the pull strip so as to reinforce the sealing flap of the plastic courier bag and facilitating the removal of the pull strip.

Preferably, the first adhesive piece of the double-sided adhesive layer covers a portion of the base piece and the entire pull strip so that the release base member may be reliably attached to the inner side of the sealing flap.

Preferably, the first adhesive piece of the double-sided adhesive layer does not cover the protrusions so as not to interfere the removal of the base piece.

To make the pull strip easier to tear, two perforated lines of appropriate lengths parallel to the pull strip are provided on the inner and outer sides of the sealing flap, respectively.

Compared to prior art, multiple sealing devices of the present invention may be applied to the inner side of a plastic courier bag and multiple reinforcing tapes may be applied to the outer side. The plastic courier bag may be quickly and conveniently opened by tearing down the pull strip. The plastic courier bag may be reused multiple times by applying new, unused sealing devices of the present invention.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
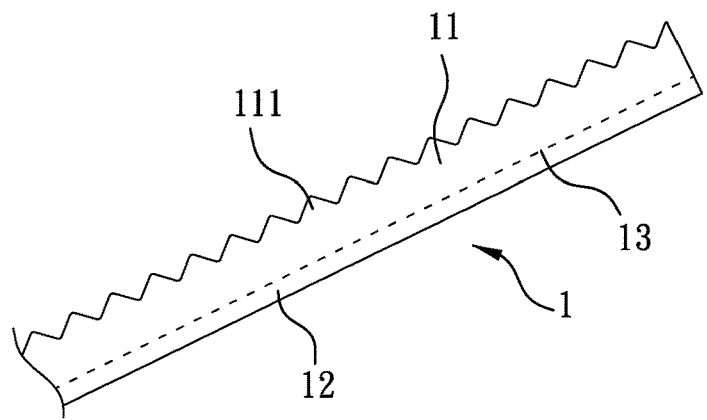
FIG. 1 is a perspective diagram showing a release base member of a sealing device according to an embodiment of the present invention.

As illustrated in FIG. 1, a sealing device according to an embodiment of the present invention includes a release base member 1 and a double-sided adhesive layer 2. The release base member 1 is made of a material capable of providing a release effect against adhesives and has an elongated strip shape. The release base member 1 may be rolled into a roll for convenient storage, transportation, and process. The release base member 1 has a separation line 13 along its length, separating the release base member 1 into a base piece 11 and a pull strip 12. The base piece 11 has a series of protrusions 111 disposed along a main edge of the base piece 11, protruding away from the separation line 13 and along a direction of the base piece 11's width. The protrusions 111 may jointly form various shapes such as a sawtooth or wave shape and may be disposed apart at equal intervals. The base piece 11 has a width greater than that of the pull strip 12.

Figure 2:
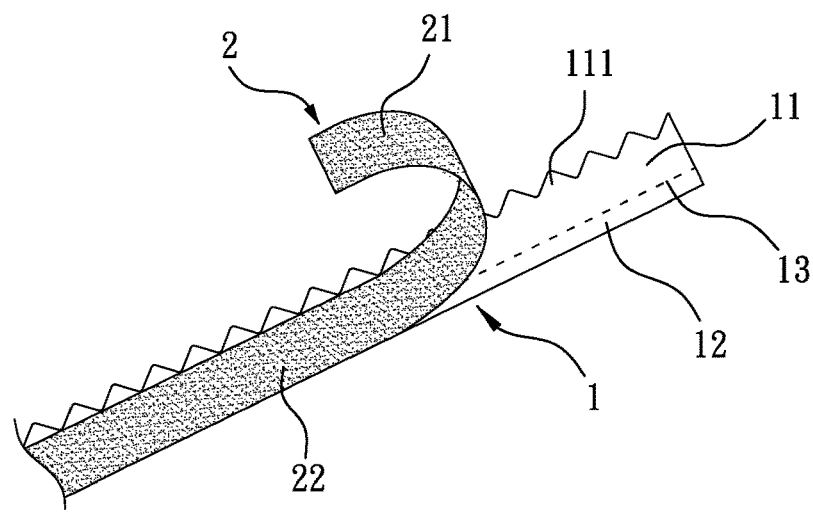
FIG. 2 is a perspective diagram showing a double-sided adhesive layer attached to the release base member of FIG. 1.
Figure 3:
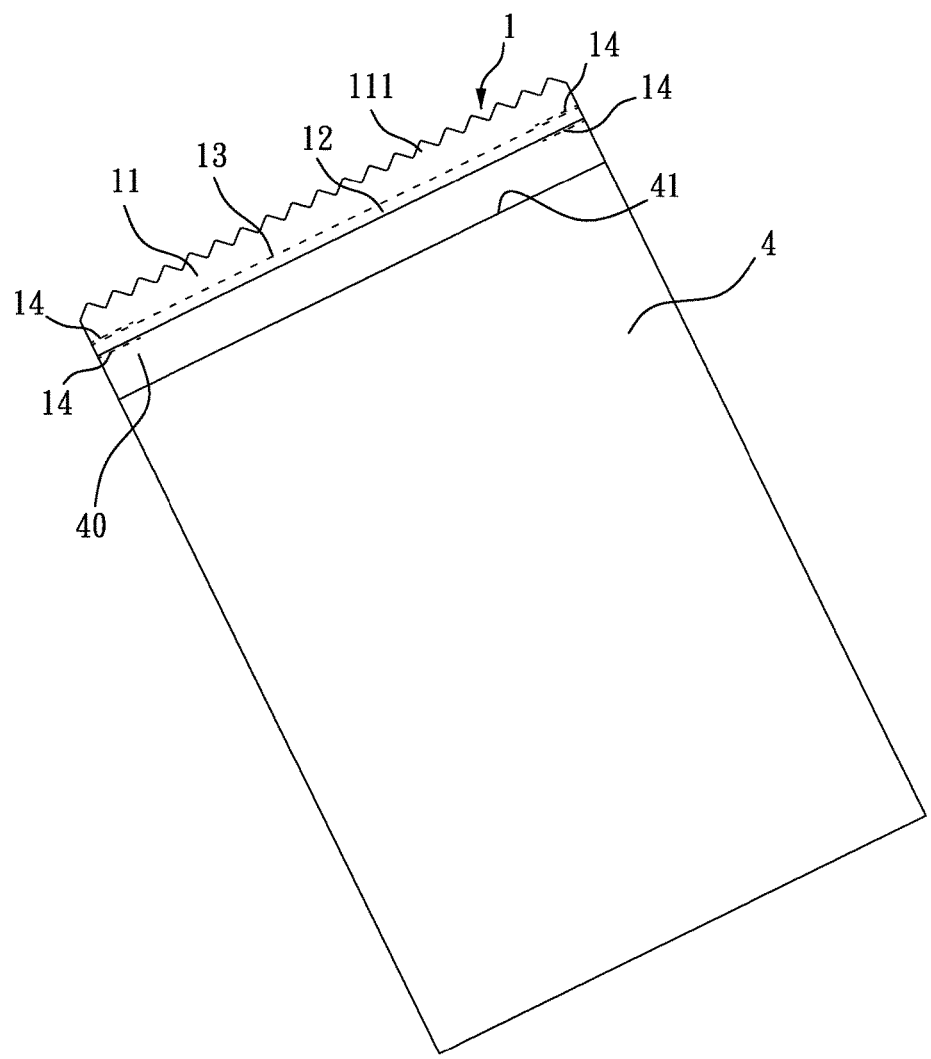
FIG. 3 is a perspective diagram showing the release base member of FIG. 1 adhering to a major flap of a plastic courier bag.

The double-sided adhesive layer 2, as shown in FIG. 2, includes a first adhesive piece 21 and a second adhesive piece 22 on two opposing major sides of the double-sided adhesive layer 2, respectively. The first adhesive piece 21 is for adhering a major side of the release base member 1. The second adhesive piece 22 is for adhering to the inside of a plastic courier bag 4's sealing flap 40, as shown in FIG. 3. In the present embodiment, the first adhesive piece 21 covers a majority portion of the base piece 11 and the entire pull strip 12. The protrusions 111 are not covered by the first adhesive piece 21.

Figure 4:
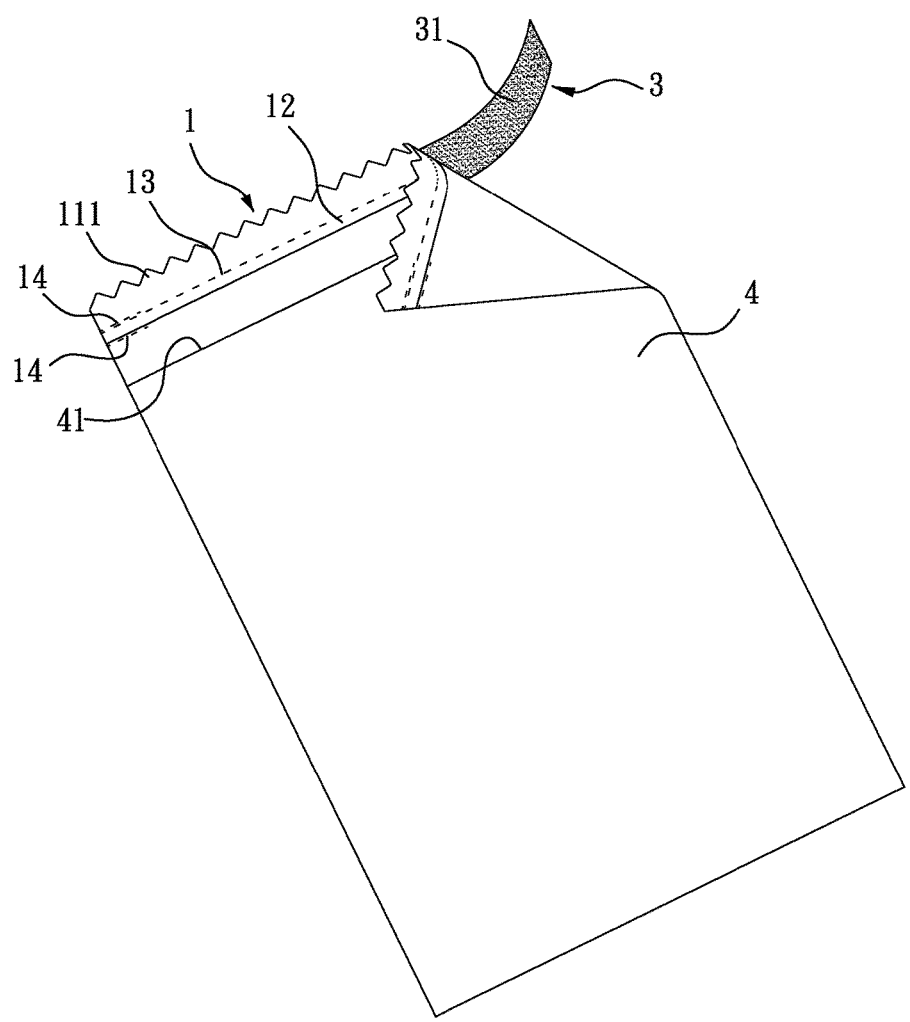
FIG. 4 is a perspective diagram showing a reinforcing tape adhering to an outer side of the plastic courier bag of FIG. 3.
Figure 5:
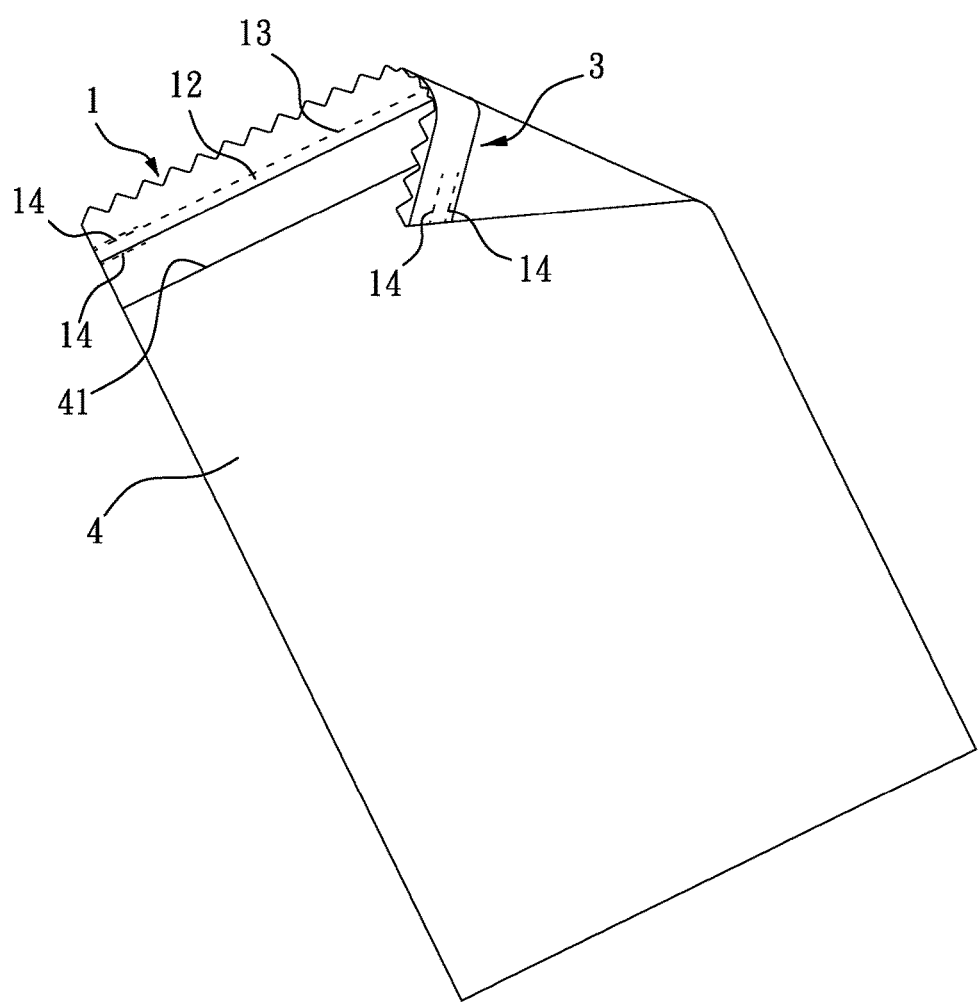
FIG. 5 is another perspective diagram showing the reinforcing tape of FIG. 4 after it is applied.
Figure 6:
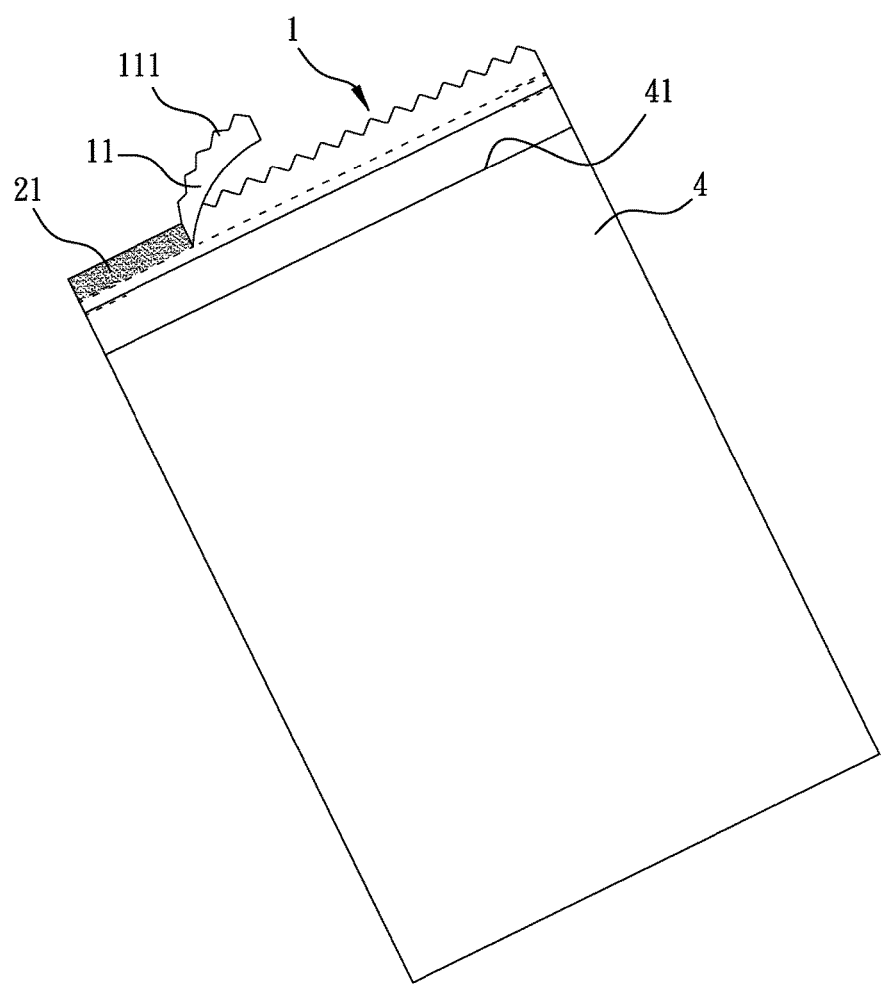
FIG. 6 is a perspective diagram showing a base piece is pulled from a plastic courier bag so as to seal the plastic courier bag.
Figure 7:
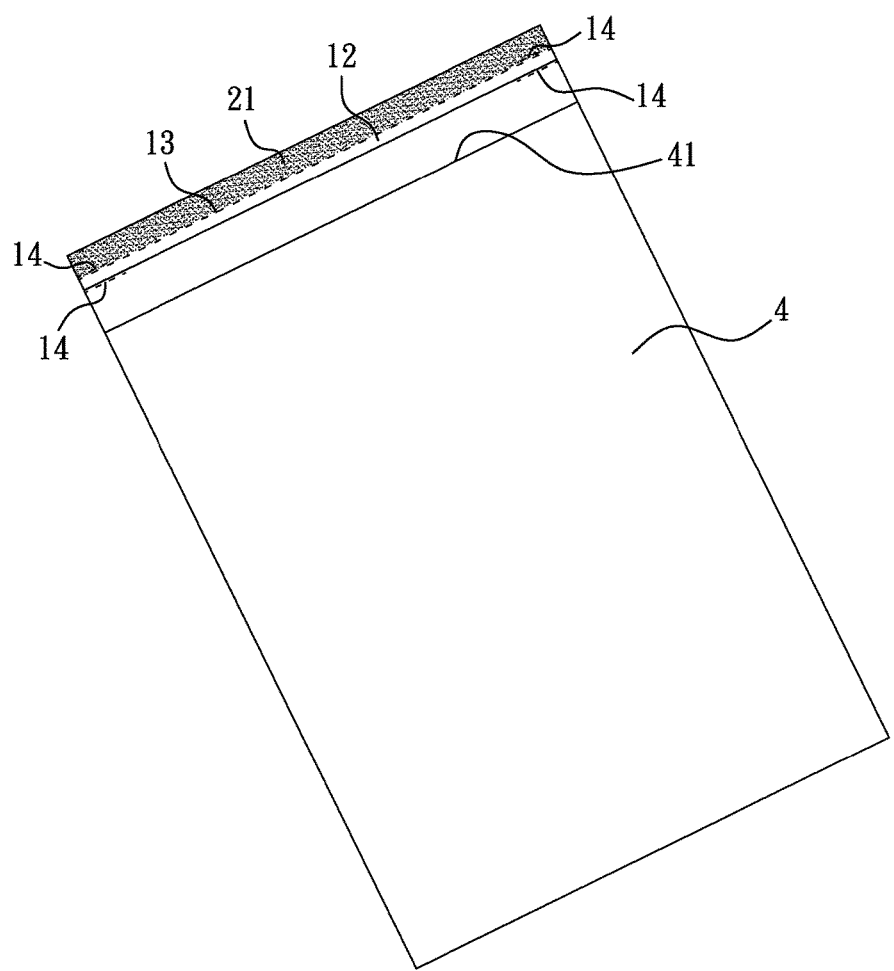
FIG. 7 is a perspective diagram showing the base piece of FIG. 6 is completely pulled off.
Figure 8:
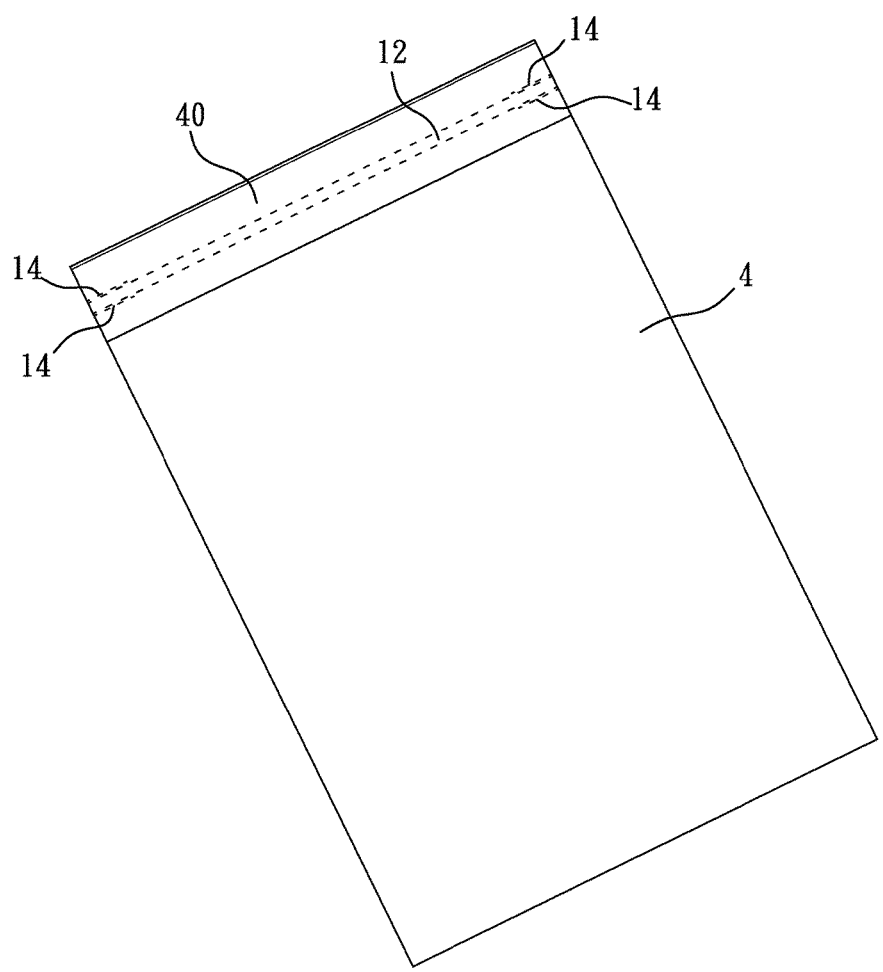
FIG. 8 is a perspective diagram showing a sealed plastic courier bag.

As also shown in FIG. 3, an ordinary plastic courier bag 4 has a bag member with an opening 41 along a side and a sealing flap 40 extended from an edge of the opening 41. The release base member 1 adheres to an inner side of the flap 40 facing the opening 41. As the sealing flap 40 is not easy to open since the plastic courier bag 4 is rather thin and the sealing flap 40 may be deformed when tearing open the sealing flap 40, an additional reinforcing tape 3 is provided. The reinforcing tape 3 has an adhesive piece 31 on a major side and has a greater width than the width of the pull strip 12. The reinforcing tape 3 is attached to an outer side of the sealing flap 40 corresponding to the pull strip 12 using the adhesive piece 31, as shown in FIGS. 4 and 5. Perforated lines 14 of appropriate lengths parallel to the pull strip 12 are provided on the inner and outer sides of the sealing flap 40, respectively. To seal the plastic courier bag 4, the base piece 11 is torn to reveal the first adhesive piece 21, as shown in FIG. 6, until the base piece 11 is completely removed, as shown in FIG. 7. Then, the to-be-delivered product is placed in the plastic courier bag 4 through the opening 41. The sealing flap 40 is flipped 180 degrees so that the first adhesive piece 21 adheres to the plastic courier bag 4 and the sealing flap 40 seals the opening 41, as shown in FIG. 8. The protrusions 111 facilitate the removal of the base piece 11 described above as they are not attached to the double-sided adhesive layer 2.

Figure 9:
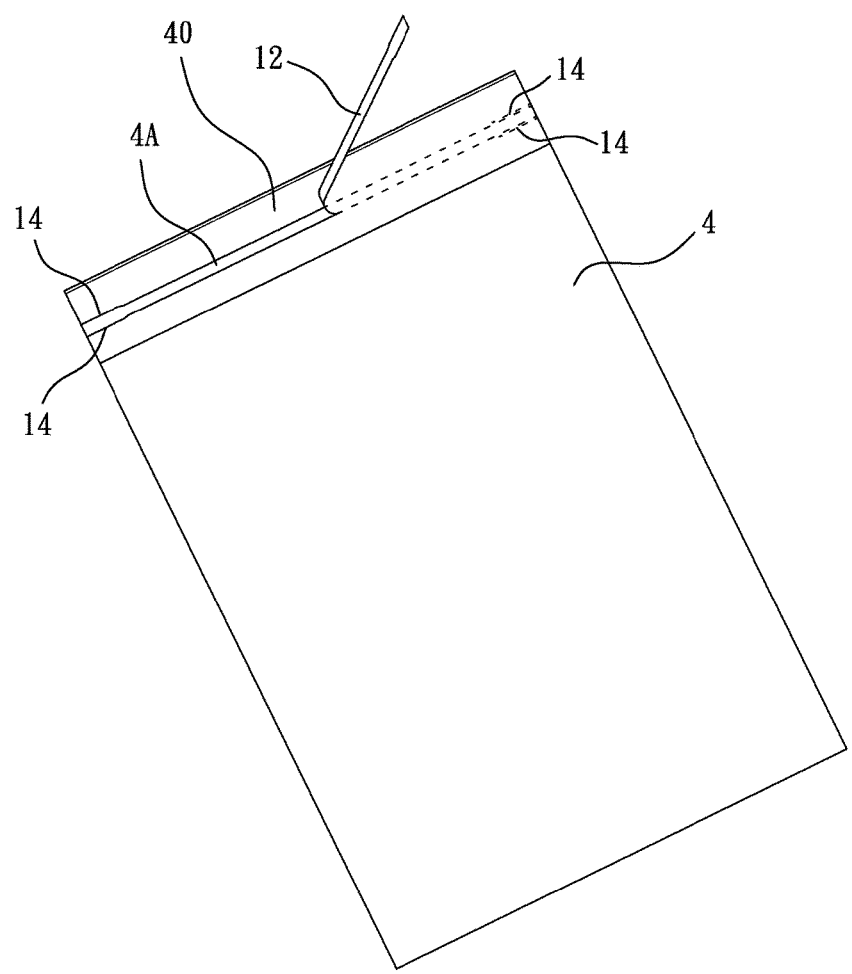
FIG. 9 is a perspective diagram a pull strip is lifted from the sealed plastic courier bag of FIG. 8.
Figure 10:
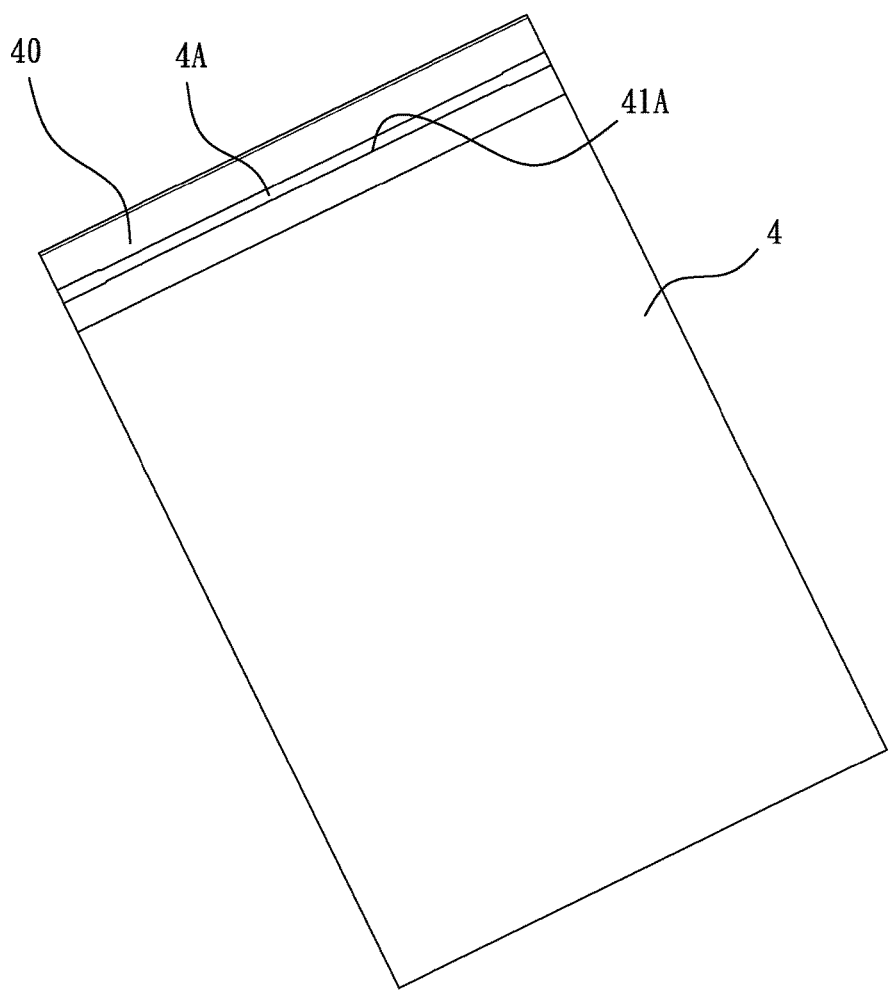
FIG. 10 is a perspective diagram showing the pull strip is completely removed from the sealed plastic courier bag of FIG. 9.
Figure 11:
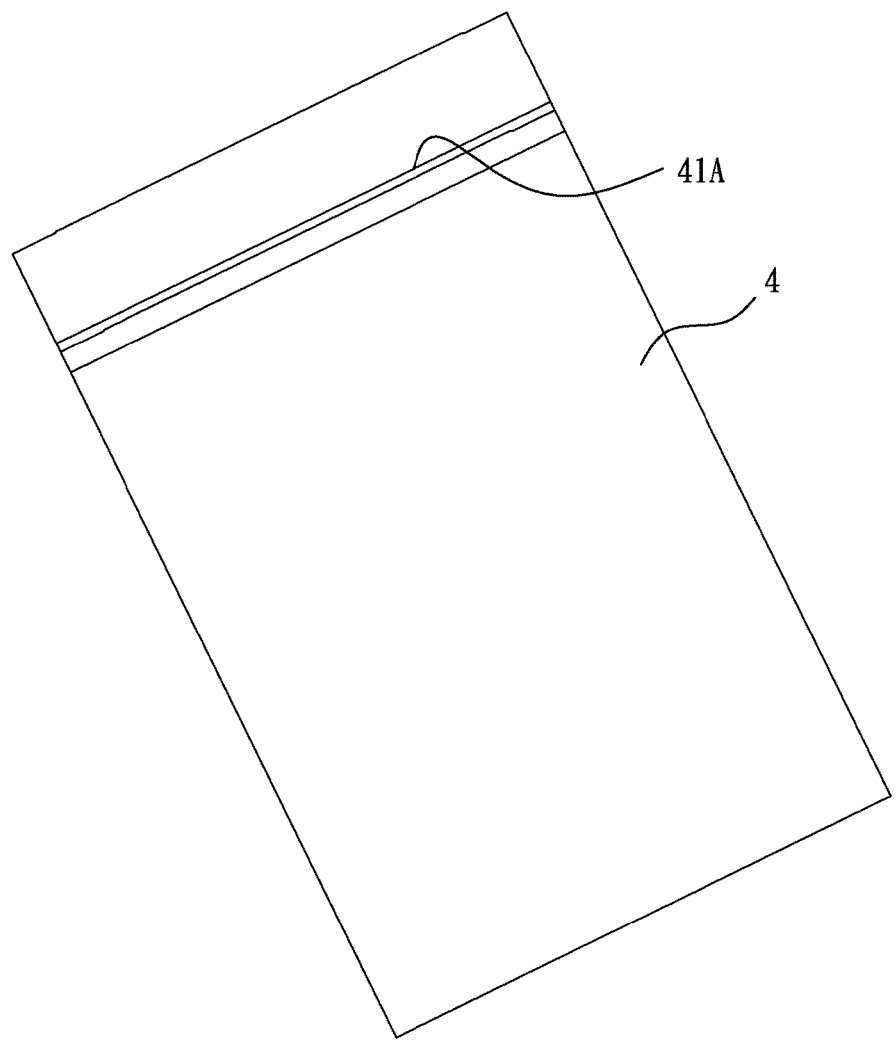
FIG. 11 is a perspective diagram showing the plastic courier bag with the sealing flap flipped open.

To open the plastic courier bag 4, any end of the pull strip 12 between the two perforated lines 14 is lifted, as shown in FIG. 9, and the pull strip 12 is pulled along the length of the release base member 1 until the pull strip 12 is completely removed, thereby forming a ditch 4A that splits the sealing flap 40 and creates a new opening 41A, as shown in FIG. 10. Then, the product inside the plastic courier bag 4 can be accessed through the opening 41A, as shown in FIG. 11.

Figure 12:
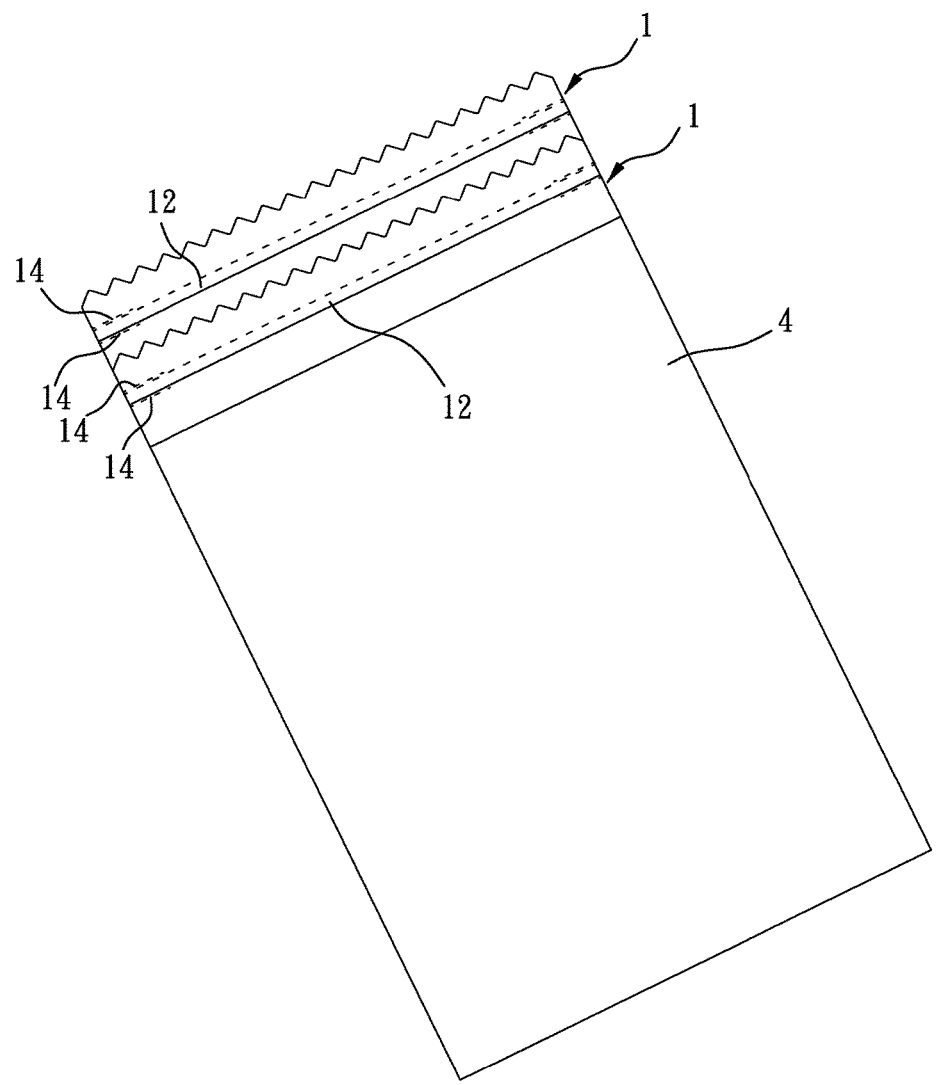
FIG. 12 is a perspective diagram showing the plastic courier bag is reused with a new sealing device applied.
Figure 13:
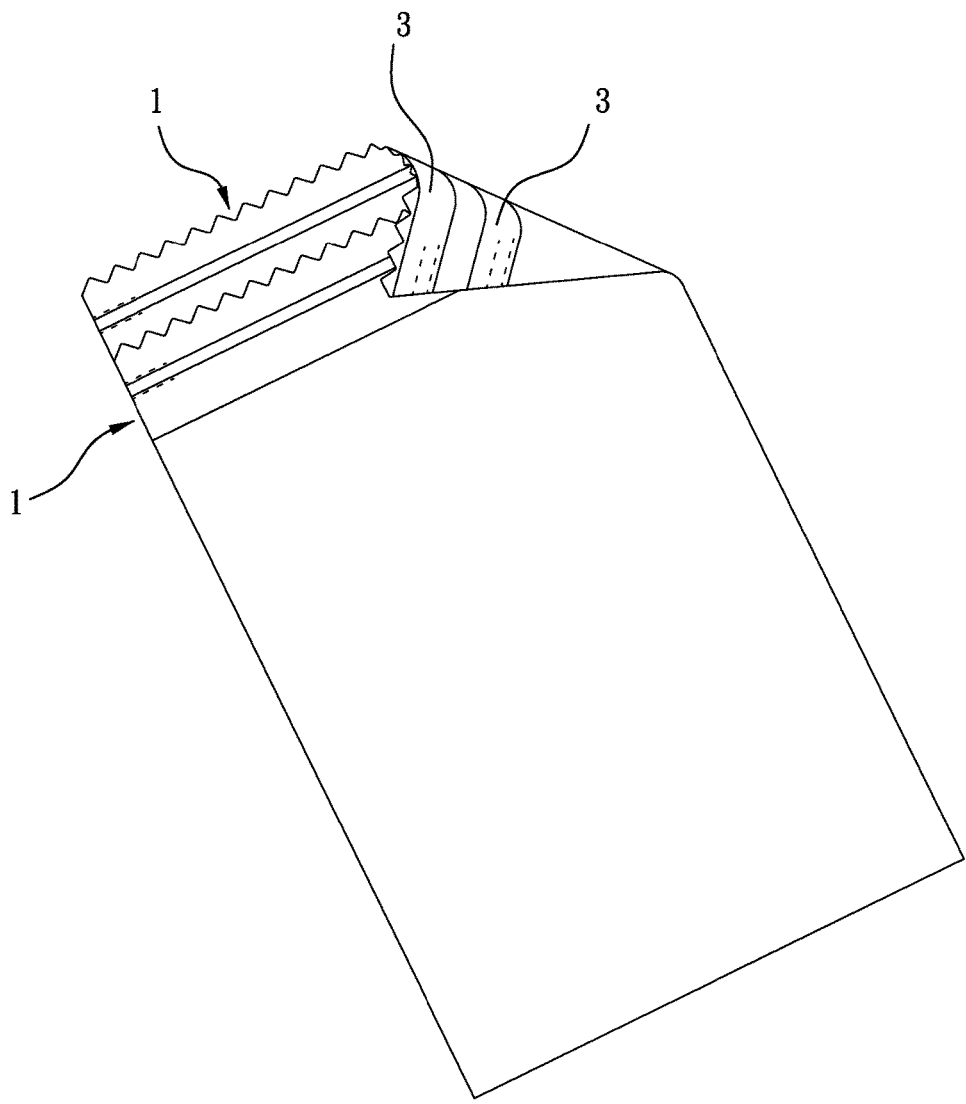
FIG. 13 is another perspective diagram showing the plastic courier bag of FIG. 12.

To reuse the plastic courier bag 4, an unused sealing device is employed and the plastic courier bag 4 is sealed and opened as described above, as shown in FIGS. 12 and 13.

As the plastic courier bag 4 is reused more times, more release base members 1 and reinforcing tapes 3 are accumulated, making the plastic courier bag 4 even more reusable.

Figure 14:
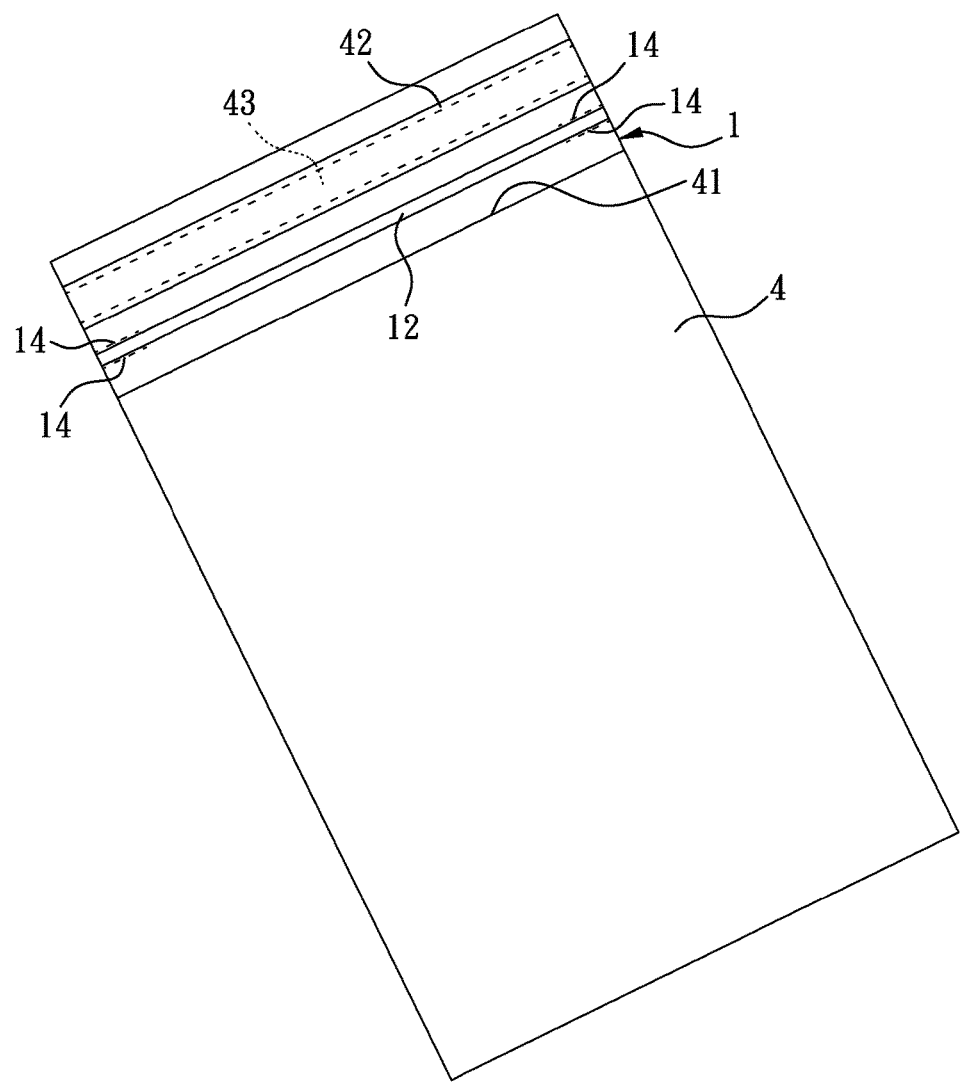
FIG. 14 is a perspective diagram showing the sealing device is applied to a different type of plastic courier bag.
Figure 15:
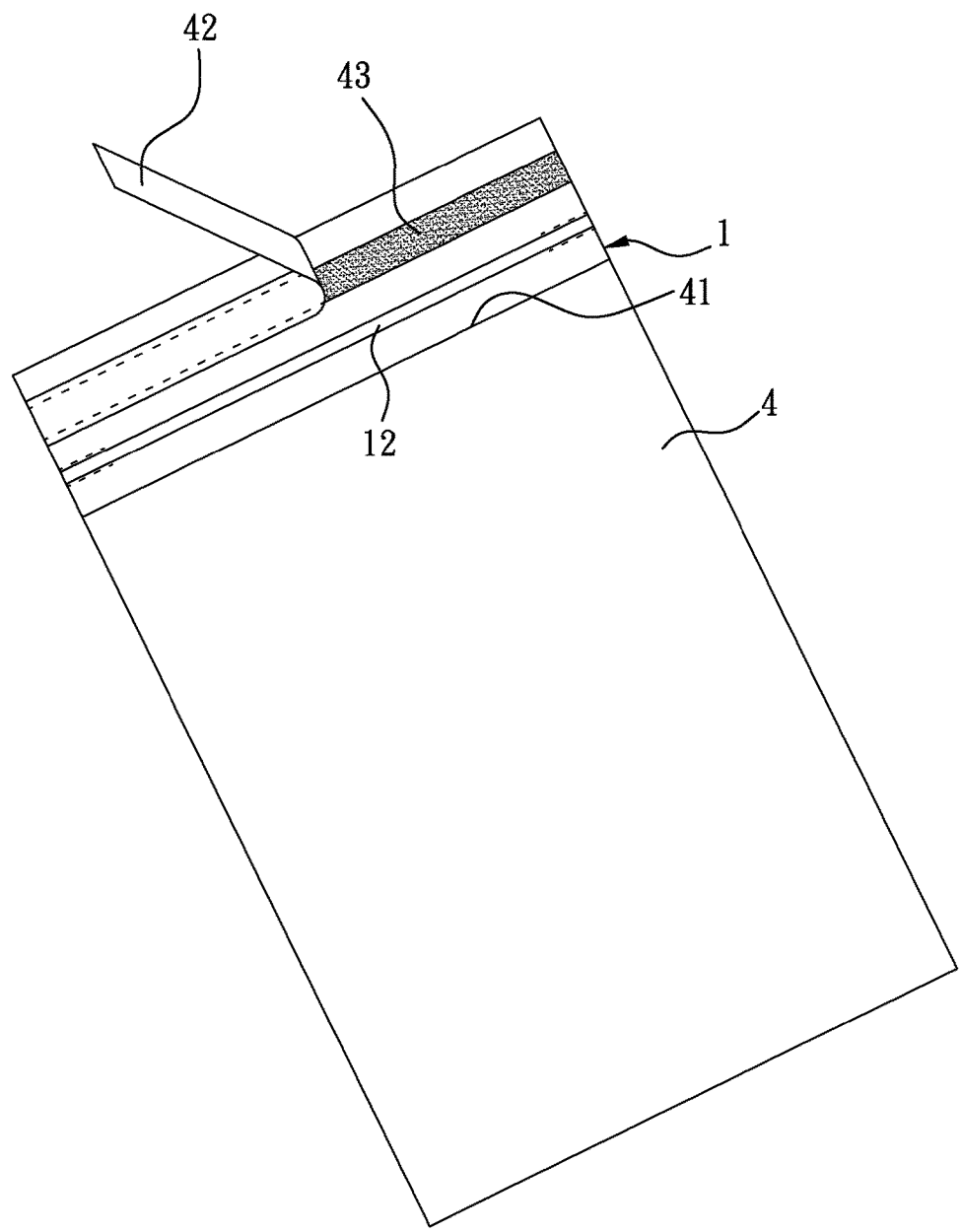
FIG. 15 is a perspective diagram showing a release paper is pulled from the plastic courier bag of FIG. 14 so as to seal the plastic courier bag.
Figure 16:
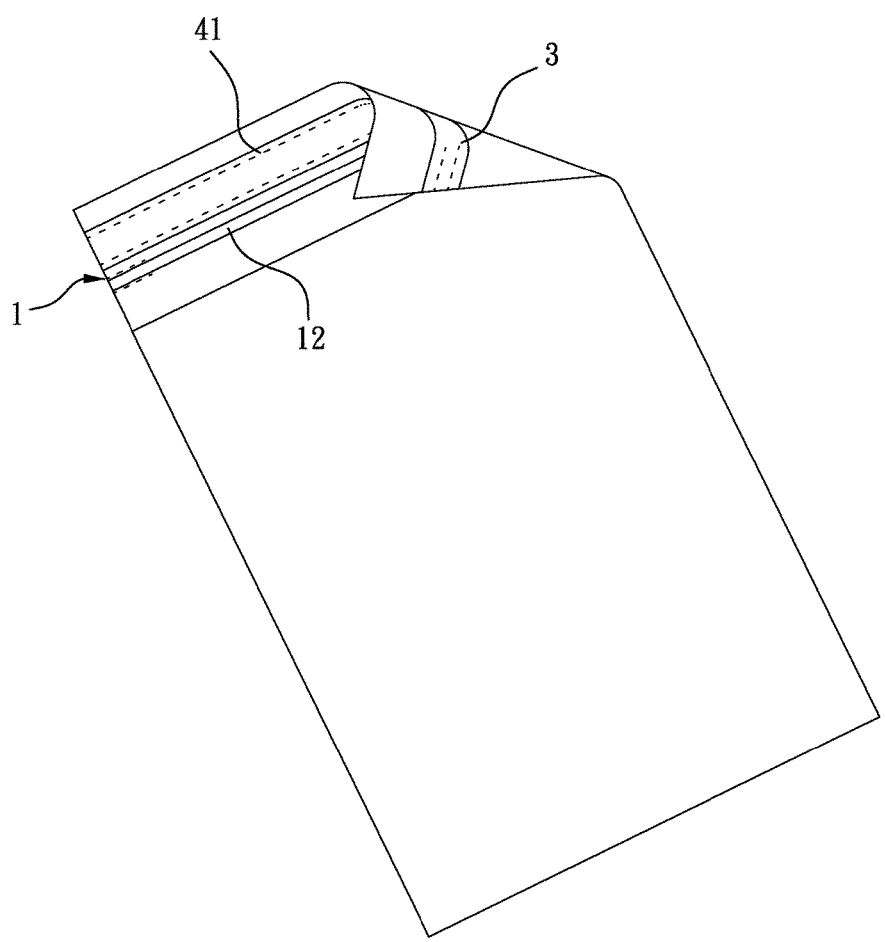
FIG. 16 is a perspective diagram showing the plastic courier bag of FIG. after the pull strip is removed so as to open the plastic courier bag.

FIGS. 14 to 16 depict an application scenario where the sealing device is applied to another type of plastic courier bag 4 which also includes a bag member, an opening 41 to the inside of the bag member, and a wider sealing flap extended from the opening 41. An inner side of the sealing flap is coated with adhesive and thereby forms an adhesive piece 43. A release paper 42 covers the adhesive piece 43. The release base member 1 of the present embodiment adheres to the inner side of the sealing flap between the opening 41 and the adhesive piece 43. The reinforcing tape 3 adheres to the outer side the sealing flap corresponding to the release base member 1.

To seal the plastic courier bag 4, as shown in FIG. 15, the release paper 42 is lifted to reveal the adhesive piece 43, and the sealing flap is flipped 180 degrees so that the adhesive piece 43 adheres the plastic courier bag 4 and the opening 41A is sealed.

To open the plastic courier bag 4, an end of the pull strip 12 between the two perforated lines 14 is lifted and the pull strip 12 is pulled along the length of the release base member 1 until the pull strip 12 is completely removed, as shown in FIG. 16. Then, the product inside the plastic courier bag 4 can be accessed through the opening, as shown in FIG. 16.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A sealing device for a plastic courier bag, comprising
   a release base member of an elongate shape having a separation line along a length of the release base member separating the release base member into a base piece and a pull strip, where the base piece has a series of protrusions disposed along a main edge of the base piece, protruding away from the separation line and along a direction of the base piece's width;

a double-sided adhesive layer having a first adhesive piece and a second adhesive piece on two major sides of the double-sided adhesive layer, respectively, where the first adhesive piece is for adhering to a major side of the release base member, the first adhesive piece covers the entire pull strip and a portion of the base piece not including the protrusions, the second adhesive piece is for adhering to an inner side of a sealing flap of the plastic courier bag, and, to seal the plastic courier bag, the base piece is removed from the release base member; and a reinforcing tape for adhering to an outer side of the sealing flap corresponding to the pull strip, where the reinforcing tape has a greater width than that of the pull strip.

2. The sealing device according to claim 1, wherein at least an additional reinforcing tape is applied to the outer side of the sealing flap.

3. The sealing device according to claim 1, wherein at least an additional release base member adheres to the inner side of the sealing flap.

4. The sealing device according to claim 3, wherein two perforated lines of appropriate lengths parallel to the pull strip are provided on the inner and outer sides of the sealing flap, respectively.

* * * * *